UNITED STATES PATENT OFFICE.

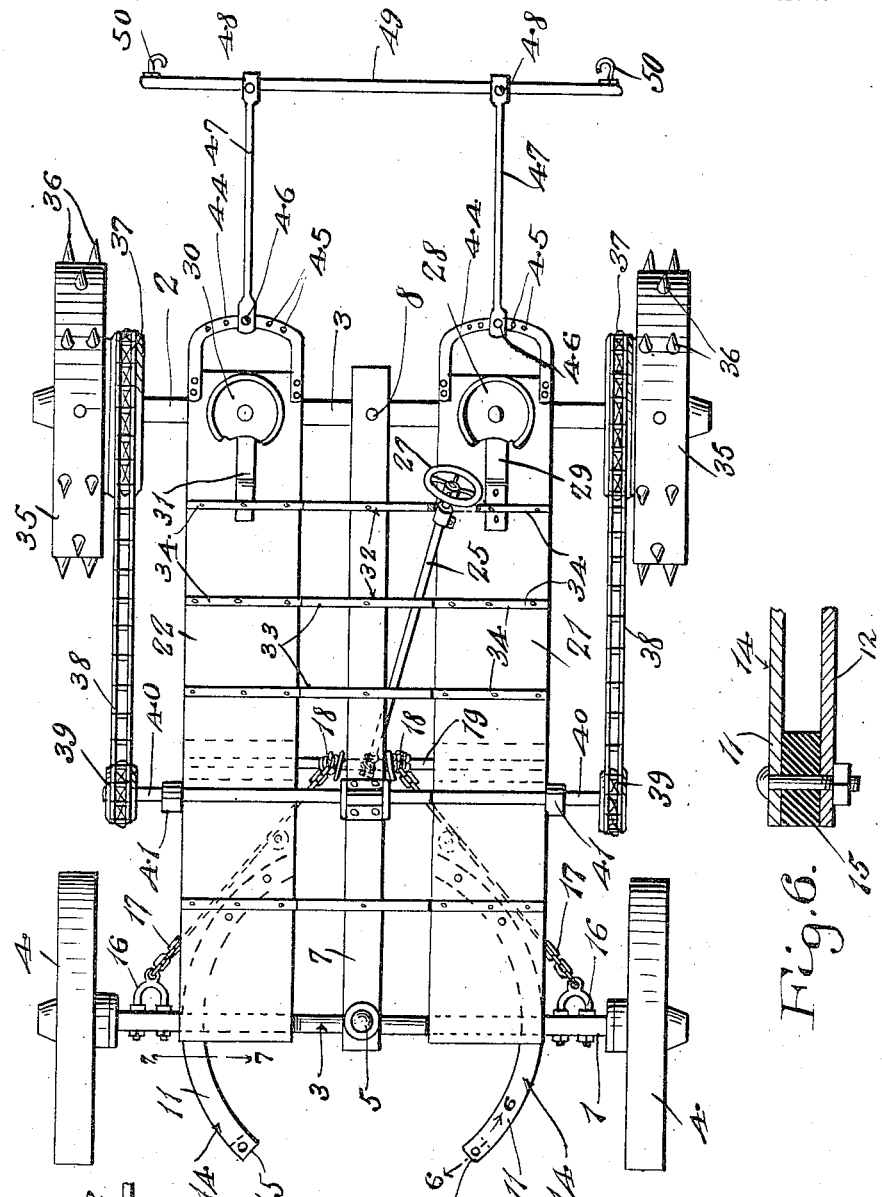

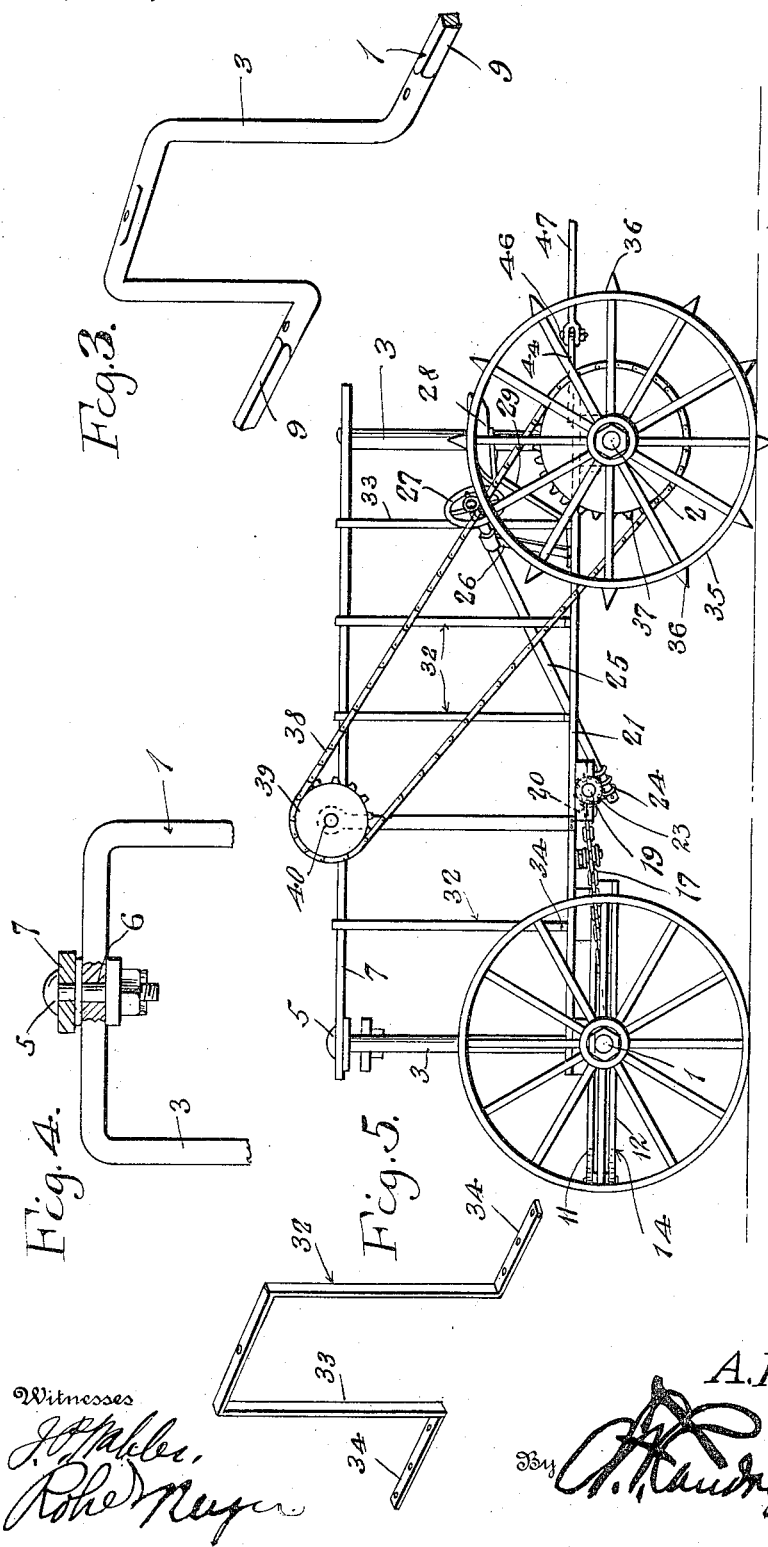

ABIAH H. GUARD, OF COLFAX, INDIANA.

TRACTOR.

1,240,338.

Specification of Letters Patent. Patented Sept. 18, 1917.

Application filed February 10, 1917. Serial No. 147,791.

*To all whom it may concern:*

Be it known that I, ABIAH H. GUARD, a citizen of the United States, residing at Colfax, in the county of Clinton and State of Indiana, have invented certain new and useful Improvements in Tractors; and I do hereby declare the following to be a full, clear, and exact description of the invention, such as will enable others skilled in the art to which it appertains to make and use the same.

This invention relates to tractors, and the primary object of the invention is to provide a tractor which is particularly designed for agricultural work, such as pulling a breaking or turning plow, cultivator or other agricultural implement.

An object of this invention is to provide a tractor as specified which is comparatively simple in construction, and the frame of which is provided with an arch disposed centrally thereof and extending longitudinally throughout the length of the tractor, so as to permit the tractor to be used for hauling a cultivator for cultivating growing corn.

Another object of this invention is to provide a tractor including a novel steering structure, whereby the tractor is steered or guided, which structure includes a fifth wheel structure having a pair of spaced plates between which portions of the front axle of the tractor ride, and to provide resilient buffers at the outer ends of the fifth wheel structure for cushioning the engagement between the axle and the ends of the fifth wheel.

Another object of this invention is to provide a novel structure including a pair of substantially U-shaped members which have rods connected thereto and extending rearwardly therefrom, to which rods a cross bar is connected, which means forms a coupling for connecting various types of agricultural implements to the tractor.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:—

Figure 1 is a top plan view of the improved tractor;

Fig. 2 is a side elevation of the tractor;

Fig. 3 is a detail perspective view of the front steering axle;

Fig. 4 is a fragmentary view of the front axle showing the manner of its connection with a part of the supporting structure of the tractor;

Fig. 5 is a perspective view of one of the braces employed in the tractor structure;

Fig. 6 is a section on the line 6—6 of Fig. 1; and

Fig. 7 is a section on the line 7—7 of Fig. 1.

Referring more particularly to the drawings, 1 designates the front supporting axle of the tractor and 2 designates the rear supporting axle of the tractor. These axles have arches 3 formed thereupon intermediate their ends which aline with each other centrally of the width of the tractor. The front axle 1 has the usual type of supporting wheels 4 mounted upon its spindle ends, and it is pivotally connected as shown at 5, through the medium of a bolt 6 to a longitudinally extending supporting bar 7 which forms a part of the supporting structure of the tractor and which is secured as indicated at 8 to the horizontal portion of the arch 3 of the rear axle 2. The front axle 1 has enlarged flattened places or portions 9 formed thereon outwardly of the arch 3 which flattened portions are positioned between spaced plates 11 and 12 of each of the arcuate sections 14 of the fifth wheel structure. The plates 11 and 12 have their forward ends connected and positioned between the facing sides of the plates at their connected ends are resilient buffing or cushioning blocks 15 which are constructed of rubber or analogous material. The axle 1 has U-shaped bolts 16 attached thereto inwardly of its spindle ends, to which bolt chains or analogous flexible means 17 are attached as clearly shown in Figs. 1 and 2 of the drawings. The rear ends of the arcuate sections 14 are attached to the platforms 21 and 22. The chains or flexible members 17 are connected, as shown at 18 to a shaft 19 for winding upon the shaft or unwinding therefrom. The shaft 19 is supported by suitable bearings 20 which are attached to the under surfaces of the side platforms 21 and 22 of the tractor. The rear ends of the platforms 21 and 22 are attached to the rear axle and these platforms are provided to form supports for the prime mover or engine and other operating parts of the mechanism of the tractor. The shaft 19 has a worm gear 23 mounted thereon with which a worm 24 meshes. The worm 24 is carried by the lower forward end of the steering post 25. The steering post 25 is rotatably supported by a suitable bearing 26 and it has a hand wheel 27 mounted upon its upper rear end for facilitating the rotation of the post. By rotating the steering post 25, the shaft 19 will be rotated for winding and unwinding the flexible member 17 thereon for pivotally moving the front steering axle 1 on the tractor for guiding the direction of travel of the tractor.

The hand wheel 27 is positioned in close proximity to one of the seats 28, of the tractor. The seat 28 is supported by a suitable standard 29 and it is positioned upon one side of the arch or center of the entire tractor structure as clearly shown in Fig. 1 of the drawings, being supported by the platform 21. A second seat 30 may be provided, which is carried by a spring standard 31. The standard 31 may be attached to the platform 22 upon the opposite side of the arch or center of the frame from the platform 21. The platforms 21 and 22 and the bar 7 have a plurality of braces 32 attached thereto which braces include upstanding substantially inverted U-shaped sections 33 and horizontally positioned arms 34 which are formed upon the lower ends of the legs or vertical portions of the sections 33 and are attached to the upper surfaces of the platforms 21 and 22.

The rear axle 2 has supporting and propelling wheels 35 mounted upon its spindle ends which wheels have a plurality of peripherally carried grouters or cleats 36 carried by their rims for facilitating the propelling proclivities of the wheels. The axle 2 has sprockets 37 mounted thereon inwardly of the wheels 35. Sprocket chains 38 travel about the sprocket 37 and about sprockets 39 which are mounted upon the propelling shaft 40. The shaft 40 is supported by suitable bearings 41 and it may be operatively connected to any suitable type of prime mover or engine which may be employed for propelling the tractor.

The platforms 21 and 22 of the tractor have U-shaped bars 44 attached thereto and extending rearwardly therefrom. The bight portions of the U-shaped bars 44 are provided with a plurality of spaced openings 45 which are adapted to receive pins 46. The pins 46 are employed for connecting coupling rods 47 to the bight portions of the U-shaped bars 44. The coupling rods 47 have their rear ends connected as shown at 48 to a cross bar 49. The cross bar 49 has hooks or clevises as indicated at 50 attached to its outer ends, through the medium of which the cross bar is hitched or connected to various types of agricultural implements such as cultivators, turning plows or the like. The provision of the plurality of openings 45 permits of the sidewise or lateral adjustments of the connection between the bars 47 and the tractor.

From the foregoing description taken in connection with the accompanying drawings, the advantages of construction and of the method of operation of the improved tractor will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a tractor structure, the combination, of a front axle and a rear axle having arches formed therein intermediate their ends, a pair of supporting platforms positioned upon each side of said arches and attached to said rear axle, a supporting bar rigidly attached to the horizontal portion of the arch of the rear axle, said front axle being pivotally connected to said supporting bar, and a plurality of bracing arches attached to said platforms and to said supporting bar.

2. In a tractor structure, the combination of a front axle, and a rear axle having arches formed therein intermediate their ends, a pair of mechanism supporting platforms positioned upon each side of the arches of said axles and attached to the rear axle, a supporting bar rigidly attached to the horizontal portion of the arch of the rear axle, said front axle being pivotally connected to said supporting bar, means for pivotally moving said front axle upon its pivotal connection with said bar for steering the direction of travel of the tractor, and a plurality of bracing arches attached to said platforms and to said supporting bar.

3. In a tractor structure, the combination, of a front axle and a rear axle having arches formed therein intermediate of their ends, a pair of platforms positioned upon each side of the arches of said axles and attached to the rear axle, a supporting bar rigidly attached to the horizontal portion of the arch of the rear axle, said front axle being pivotally connected to said supporting bar, a fifth wheel structure carried by said platforms and extending forwardly therefrom, said fifth wheel structure including a pair of arcuate members each of which is composed of a pair of spaced plates, said front axle provided with flattened portions positioned between each pair of said spaced plates, said plates adapted for guiding the pivotal movement of said axle.

4. In a tractor structure, the combination, of a front and rear axle having arches formed therein intermediate their ends, a supporting structure carried by said axles, a fifth wheel structure carried by said supporting structure and extending forwardly therefrom, said fifth wheel structure including a pair of arcuate members, each of which is composed of a pair of spaced plates, said front axle provided with flattened portions positioned between each pair of said spaced plates, said plates adapted for guiding the pivotal movement of said front axle.

5. In a tractor structure, a front and rear axle having arches formed therein, a supporting platform attached to said rear axle upon each side of said arches, a supporting bar rigidly attached to the arch of the rear axle and pivotally connected to the arch of the front axle, means for pivotally moving said front axle for steering the tractor, said platforms forming supports for a part of the steering mechanism and for the operating mechanism of the tractor.

6. In a tractor structure, the combination, of a pair of arch axles, a pair of supporting platforms carried by said axles upon each side of the arches thereof, a pair of U-shaped bars attached to the rear ends of said platforms, rods pivotally and adjustably connected to the bight portions of said substantially U-shaped bars, a cross bar attached to the rear ends of said pivoted bars, and coupling members carried by said cross bar.

7. In a tractor structure, the combination, of a supporting structure, a front axle pivotally carried by said supporting structure, a pair of substantially U-shaped bars attached to the rear end of said supporting structure, coupling rods adjustably connected to said U-shaped members, a cross bar connected to the rear ends of said coupling rods, and coupling means carried by said cross bar.

In testimony whereof I affix my signature in presence of witnesses.

ABIAH H. GUARD.

Witnesses:
 FRED E. PARKER,
 HOMER R. WOODBURN,
 J. H. SCHUCK.

Copies of this patent may be obtained for five cents each, by addressing the "Commissioner of Patents, Washington, D. C."